US011379591B2

(12) United States Patent
Jochems et al.

(10) Patent No.: US 11,379,591 B2
(45) Date of Patent: Jul. 5, 2022

(54) METHODS AND DEVICES FOR USER AUTHORIZATION

(71) Applicant: Sony Corporation, Tokyo (JP)

(72) Inventors: Barbara Jochems, Stuttgart (DE); Conor Aylward, Stuttgart (DE); Erbin Lim, Stuttgart (DE); Francesco Cartella, Stuttgart (DE); Francisco Fatore, Stuttgart (DE); Johan Duyshaver, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 56 days.

(21) Appl. No.: 16/831,826

(22) Filed: Mar. 27, 2020

(65) Prior Publication Data

US 2020/0311285 A1 Oct. 1, 2020

(30) Foreign Application Priority Data

Mar. 28, 2019 (EP) .................... 19165816

(51) Int. Cl.
G06F 21/57 (2013.01)
H04L 67/00 (2022.01)
G06F 21/44 (2013.01)
G06F 21/34 (2013.01)
G06F 21/00 (2013.01)

(52) U.S. Cl.
CPC ............ *G06F 21/577* (2013.01); *G06F 21/34* (2013.01); *G06F 21/44* (2013.01); *H04L 67/34* (2013.01)

(58) Field of Classification Search
CPC ........ G06F 21/577; G06F 21/34; G06F 21/44; G06F 21/30; G06F 21/42; G06F 21/45; G06F 21/46; G06F 21/31; H04L 67/34
See application file for complete search history.

(56) References Cited

U.S. PATENT DOCUMENTS

| 9,160,742 B1 | 10/2015 | Ackerman et al. |
| 9,712,520 B1 * | 7/2017 | Canavor ................. H04L 67/14 |
| 9,959,399 B2 | 5/2018 | Su |
| 2012/0180124 A1 | 7/2012 | Dallas et al. |
| 2015/0039513 A1 * | 2/2015 | Adjaoute ............ H04L 63/1425 705/44 |
| 2016/0307199 A1 * | 10/2016 | Patel ...................... G06Q 20/32 |

* cited by examiner

*Primary Examiner* — Edward Zee
(74) *Attorney, Agent, or Firm* — Xsensus LLP

(57) ABSTRACT

The disclosure relates to a method (100) for assessing user authorization, the method comprising: receiving (110), via a data communication network (330), a request from a user device (300) for an access; generating (120), based on data associated with the request, a risk score indicating a risk that the request was sent by a non-authorized user, wherein the risk score indicates a high risk, a medium risk, or a low risk that the user (400) is a non-authorized user; and signaling (130), via the data communication network (330), the user device (300) a need for further information to enable a decision about the authorization of the user (400), if the risk score indicates medium risk. A further aspect relates to a method (200) for user authorization and to an electronic device (300).

12 Claims, 2 Drawing Sheets

METHODS AND DEVICES FOR USER AUTHORIZATION

CROSS-REFERENCE TO RELATED APPLICATION

The present application claims priority to EP 19165816.0, filed Mar. 28, 2019, the entire contents of which are incorporated herein by reference.

FIELD

The present disclosure relates to methods for user authorization. Further aspects relate to electronic devices enabling proposed concepts of user authorization. For example, improved user authorization may prevent or reduce fraudulent abuse of user accounts for data transactions, such as in data transactions related to e-commerce or the like.

BACKGROUND

In an increasingly connected world, both service providers, e.g. for e-commerce, and their users benefit from streamlined access and quick data transactions over data networks, such as the Internet. Prominent examples of such data transactions are online purchases of goods, software, or services over e-commerce platforms. Unfortunately, the shift to digital communication and record keeping also gives fraudsters multiple entry points for abusing user accounts. A user account allows a user to authenticate to a service provider's system and potentially to receive authorization to access resources provided by or connected to that system. To log into an account, a user is typically required to authenticate oneself with a password or other credentials for the purposes of accounting, security, logging, and resource management, just to name a few examples. However, account data may be used illegally and there may be a need to determine a risk whether the user is unauthorized, although he has correct login information, for example.

For a service provider it may be necessary to decide within a short duration of time whether an authorization request is sent from an authorized user with a low risk of making a wrong decision (e.g. to decide that the user is authorized although he is not). Risk detectors may be used for detecting unauthorized use of user accounts. However, for improved risk analysis an increased amount of data and time for processing the amount of data may be required by risk detectors, possibly resulting in undesired delays during the authentication process. For example, to accelerate an authentication procedure, risk detectors may be omitted. However, without risk detectors only low fraud protection may be achieved.

SUMMARY

There may be a need for concepts for improved assessment of user authorization that enable faster and/or more reliable authentication of the user.

This need is met by the subject matter in accordance with concepts and examples proposed in the following.

According to a first aspect, the present disclosure provides a method for assessing user authorization. The method comprises receiving, via a data communication network, a request from a user device for an access. Further, the method comprises generating, based on data associated with the request, a risk score indicating a risk that the request was sent by a non-authorized user. The risk score indicates a high risk, a medium risk, or a low risk that the user is a non-authorized user. Further, the method comprises signaling, via the data communication network, the user device a need for further information to enable a decision about the authorization of the user, if the risk score indicates medium risk. Signaling the need for further information may comprise generating an information signal indicating that no decision (e.g. reliable decision) about the authorization of the user can be made without the further information. For example, signaling the need for further information may comprise transmitting a request for further information, e.g. to the user device.

According to a further aspect, the present disclosure provides a method for user authorization or authentication. The method comprises sending, via a data communication network, a request for an access. Further, the method comprises receiving, via the data communication network, instructions for running a program and running the program for generating a device generated risk score indicating a risk that the request was sent by a non-authorized user. Further, the method comprises sending, via the data communication network, the device generated risk score.

Another aspect relates to an electronic device comprising a transceiver configured to transmit data to another electronic device and receive data from the other electronic device, via a data communication network. Further, the electronic device comprises a processing circuitry configured to perform a method comprising receiving, via the data communication network, a request from the other electronic device for an access, and generating, based on data associated with the request, a risk score indicating a risk that the request was sent by a non-authorized user. The risk score indicates a high risk, a medium risk, or a low risk that the user is a non-authorized user. The processing is further configured to perform a method comprising signaling, via the data communication network, the other electronic device a need for further information to enable a decision about the authorization of the user, if the risk score indicates medium risk.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
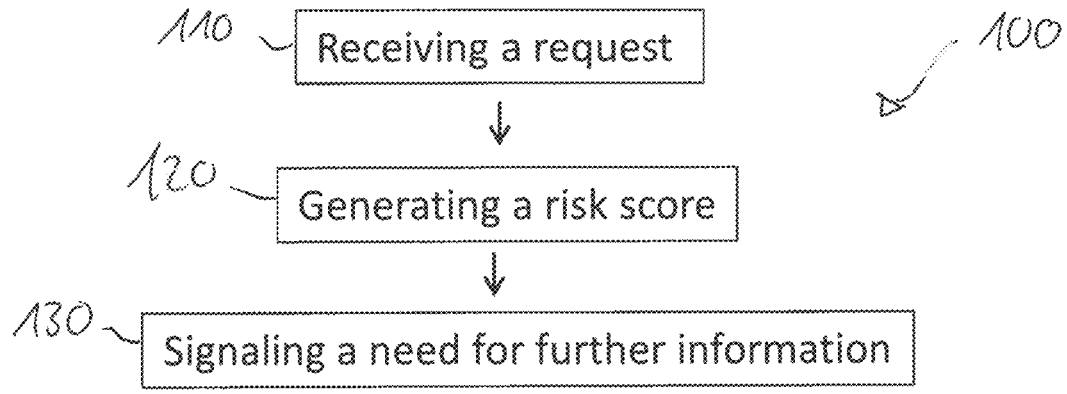
FIG. 1 shows a flow chart of a method for assessing user authorization.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Risk detectors may be improved by use of a higher amount of data e.g. sent from a user device to a provider (e.g. online server) together with a request for access to a service. For example, by sending device data of the user device together with the request, a reliability of a decision whether a user is authorized or not could be increased due to enabling a more detailed evaluation based on more data. However, there may be requirements to reduce the amount of data that is sent from the user device e.g. via the Internet, e.g. to reduce data traffic. Further, there may be privacy restrictions and it might not be possible or desirable to send all data required for an improved assessment of user authorization. Concepts proposed in the following may enable improved user authentication.

FIG. 1 shows a flow chart of a method 100 for assessing user authorization. The method 100 comprises receiving 110, via a data communication network, a request from a user device for an access. The method 100 further comprises generating 120, based on data associated with the request, a risk score indicating a risk that the request was sent by a non-authorized user. The risk score indicates a high risk, a medium risk, or a low risk that the user is a non-authorized user. Further, the method 100 comprises signaling 130, via the data communication network, the user device a need for further information to enable a decision about the authorization of the user, if the risk score indicates medium risk.

For example, a user requests a service (e.g. online service or an access in general) and a request for access may be sent from the user device and may be received 110. The request may be received 110 by a provider of the service or by a device providing assessment of user authentication for the service, for example. For example, a device receiving 110 the request may be configured to assess the authorization of the user and/or may be configured to block or allow the request (e.g. to generate a signal comprising information about the result of assessment of the authorization). The request may be received 110 e.g. by an electronic device (e.g. terminal station) and/or by an online server or a cloud service, for example. Alternatively, the method may be used for user authorization of other requests, for example for access to a user account and/or e.g. a request for access to a predefined area or room, e.g. to a restricted access area. For example, the authorization of the user may be assessed at a local terminal configured to provide an access. For example, the authorization of the user may be assessed by an online service configured to provide an access, e.g. the authorization may be assessed at an online server.

The user device may be any electronic device, e.g. a computer, a smartphone, a game console or the like. The user device is configured for sending data via the data communication network, e.g. a wireless network or the Internet. For example, access to an online service or cloud service may be requested, and the request may be sent via the Internet. When sending the request, the user may be logged into an account. Alternatively, the request may be a request for access to an account. For example, it may be possible that a local service or local access is requested, and the request may be sent via a local area network (e.g. WLAN, e.g. Intranet) or via a direct data link, e.g. Bluetooth or a nearfield communication (NFC) data link.

Based on the request, the risk score may be generated 120, e.g. at the online server. For generating 120 the risk score, information available at the online server may be used, e.g. relating to a prior use of the user account and/or prior requests for access. A standard risk detector may be used to evaluate a risk whether the request is sent by an unauthorized user. For example, if within the last minutes a very high number of same requests were sent by the user, the risk score may indicate a high risk for abuse of the user account (e.g. the risk score is above an upper threshold), and the request may be blocked instantly. In other cases, e.g. if the request is received at a regular time and/or from a same IP address as authorized prior requests, the risk score may indicate low risk (e.g. the risk score is below a lower threshold), and the request may be allowed instantly.

In other cases, it may be unclear whether the request is sent by an authorized user. For example, the risk score may be in the range between the upper threshold and the lower threshold and may signal medium risk. In such cases, it might not be possible to make an instant decision about the authorization of the request without further information e.g. about the user device. Therefore, according to the proposed method the need for further information to enable a reliable decision is signaled 130, e.g. if the risk score indicates (e.g. signals) medium risk. This e.g. enables to provide, transmit and/or process further information or data for the assessment of user authorization only in such cases where further information is needed.

The proposed method thus enables to differentiate between cases where an instant decision about the authorization of a request is possible and other cases where further information is needed. Therefore, a fast decision may be possible, in cases where abuse of a user account is obvious, for example, or where an authorized use of the user account is very likely. Only in cases that are unclear based on the request, the need for more information is signaled, for example. Therefore, e.g. further data only has to be provided e.g. to the risk detector, in the case that the risk score indicates medium risk. Consequently, in all unambiguous cases, no additional data has to be transmitted and/or processed unnecessarily and a fast assessment may be achieved. For example, in some cases a reliable risk assessment could be possible without the need of an accurate but time-consuming risk detector.

Further examples relate to concepts that may enable a reliable decision about the authorization of the user in the case the risk score indicates medium risk. Accordingly, the method may comprise sending instructions for running a program to the user device to enable running the program and generating a device generated risk score at the user device. For example, the method may comprise requesting the user device to generate a device generated risk score. Further, the method may comprise receiving the device generated risk score from the user device and using the device generated risk score for assessing the user authorization.

For example, if based on the request no reliable decision about the authorization of the user is possible, a program (e.g. a local risk detector) can be run at the user device. The instructions may comprise program code to enable running the program at the user device. For example, the instructions may be an instruction to run a program already installed at the user device. The program may be a risk detector that is executed locally at the user device. The local risk detector may use data and information of the user device to generate the device generated risk score that is not available e.g. at the online server. The device generated risk score is an embodiment of the further information that may be needed for assessing the authorization of the user, e.g. if the risk score generated e.g. at the service provider indicates medium risk.

By generating the device generated risk score directly at the user device, an amount of data that needs to be transmitted from the user device e.g. to the online server may be reduced compared to other concepts where device data is sent to the online server and a risk score based on device data is generated at the online server. Sending only the device generated risk score may require transmitting only a very small amount of data while providing additional information relating to the user authorization. For example, the program to generate the risk score is already available at the user device and only an instruction comprising information about which device data to use for generating the device generated risk score is sent to the user device.

The instructions for running the program may comprise an instruction to use data of the user device to generate the device generated risk score, wherein the data itself is (e.g. sensitive) data that is not to be sent from the user device. For example, the user device does not send the data needed for assessment of the user authorization away from the user device. The data used for generating the device generated risk score is data not shared by the user device with other devices, for example. For example, the data used for generating the device generated risk score is private data of the user or is subject to data regulation, e.g. sensitive data.

For example, the user has configured the user device such that specific data useful for assessing the authorization of the user may not be sent from the user device. By generating the device generated risk score directly at the user device it may be avoided to send sensitive data via the Internet, for example. Therefore, also for users with high privacy-awareness, an improved or more reliable authentication procedure may be available. The proposed concept reduces the amount of data that has to be sent to an external server, for example.

For example, the instructions for running the program are adapted for the user device according to at least one aspect of the request resulting in the risk score signaling medium risk. For example, the instructions for running the program may comprise instructions to use data of the user device relating to a geographical position, if the request is received from outside of a predefined region. The predefined region may be a home country of the user or city where the user lives (e.g. the information may be available from the user account of the user). The user may have defined the predefined region, e.g. when creating the user account, e.g. as a region where he regularly wants to use the service. For example, medium risk is signaled because the request was sent from an IP address in another country than a home country indicated in the user account. The instructions may relate to geo-positions of the user device, for example. For example, stored geo-data of the user device may indicate that the user has travelled from the home country to the other country, and the device generated risk score may signal a low risk of abuse of the user account. For example, the instructions may relate to sensors of the user device to be used by the program, and the program may be adapted to different devices with different kinds of sensors available. By adapting the instructions, personalized risk detection may be enabled.

For example, the instructions for running the program comprise an instruction to use data relating to at least one of a geographical position of the user device, information about a configuration of the user device, and information about usage of the user device. For example, the configuration of the user device may signal uncommon hardware settings, e.g. indicating automated use of the user device (e.g. enabling sending a high number of requests automatically) instead of regular use. For example, the information about usage of the user device may relate to programs or applications run at the user device and/or how long they are used. By analyzing hardware and/or software settings, fraud may be detected as unauthorized users may use devices in a different way than regular or authorized users.

For example, the instructions for running the program comprise an instruction to use data stored in memory of the user device. Instead of generating data, e.g. by use of sensors of the user device, to generate the device generated risk score, historical data of the user device may be used. This may indicate a change of use of the user device, for example. For example, a high amount of stored data may improve the result of the local risk detector.

For example, the instructions for running the program comprise instructions in a domain specific language. Using a domain specific language may enable to provide a less complex program for generating the device generated risk score and/or faster generation of the device generated risk score, for example. The program or local risk detector executed at the user device may be based on artificial intelligence algorithms. For example, the local risk detector may be trained before sending the instructions (e.g. at the online server) so that it can be executed directly at the user device. Alternatively or additionally, the local risk detector may be trained at the user device.

After receiving the device generated risk score, e.g. at the online server, there may still be an uncertainty about the authorization of the user. Therefore, e.g. an iterative process is proposed. For example, if the device generated risk score or a combination of the device generated risk score and the risk score indicates (e.g. signals) a medium risk, the method further comprises sending additional instructions for running the program to the user device to enable generating a further device generated risk score at the user device, and receiving the further device generated risk score from the user device.

For example, when sending instructions for running the program a second (or further) time, more specific instructions and/or different instructions may be sent to enable a more detailed and/or situation adapted evaluation of the authorization of the user. For example, there may be a maximum number of iterations before the request is finally rejected (e.g. after 3, 5, 10 or 20 iterations; or if there is no further information that could be used to generate an improved device generated risk score). The number of iterations before a final decision may depend on an accepted time tolerance (e.g. time out) established in each use case. For some business, a final decision is needed in a fraction of seconds, for example. For others, it may be acceptable to wait hours until settling. So according to that and to the complexity of the performed checks, in some cases there may be the possibility to iterate just once and in others, to exhaust all possibilities.

Based on the device generated risk score or a combination of the initial risk score (based on the request) and at least one device generated risk score, a reliable decision about the authorization of the user may be made. For example, the method may comprise allowing the request, e.g. allowing the user to use the requested online service, if the risk score and/or the device generated risk score indicates a low risk.

Alternatively, e.g. if the risk score, the device generated risk score or a combination of both indicates or signals a high risk, the request of the user (e.g. to use the online service) may be rejected and/or a fraud detection signal may be generated to signal a high probability of a request of a non-authorized user.

For example, data associated with the request (e.g. the request received from a user device) may be an IP address and/or a time of sending the request and/or a location from which the request is sent and/or an evaluation of corresponding requests (e.g. a frequency of received requests of a same kind), for example.

Figure 2:
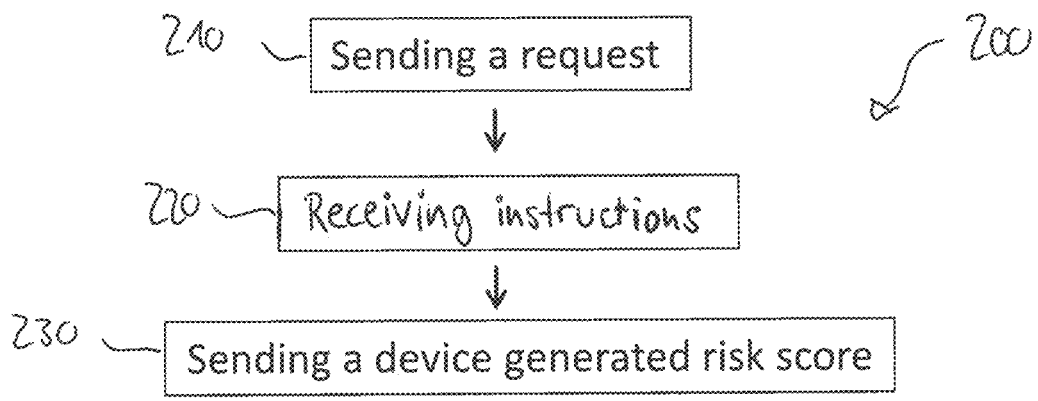
FIG. 2 shows a flow chart of a method for user authorization.

FIG. 2 shows a flow chart of a method 200 for user authorization or authentication. For example, the method 200 may be performed by a user device, when a user of the device requests an access. The method 200 comprises sending 210, via a data communication network, a request for an access (e.g. to an online server to access an online service). Further, the method 200 comprises receiving 220, via the data communication network, instructions for running a program and running the program for generating a device generated risk score indicating a risk that the request was sent by a non-authorized user. For example, the instructions may be received from the online server. Further, the method 200 comprises sending 230, via the data communication network, the device generated risk score (e.g. to the online server).

According to the method 200, there may be no need to send data, e.g. private or sensitive data, from the user device e.g. to an online server. However, all data of the user device may be used to generate the device generated risk score, for example. The device generated risk score based on the device data may be sent 230 without sending the device data itself. In this way, requirements of data regulation may be fulfilled, for example, while enabling improved authentication of a user.

As mentioned, the device generated risk score may be sent 230 without sending data used to generate the risk score. For example, data used to generate the device generated risk score relates to at least one of a geographical position of a user device, information about a configuration of a user device, and information about usage of a user device. For example, data used to generate the device generated risk score relates to data stored in memory of a user device. For example, the user of the user device may allow access to the data used for generating the device generated risk score by local programs but forbids to send this data from the user device, for example via the Internet, e.g. due to reasons of data security.

In combination with the method 100 described above, the method 200 may be used in a system (e.g. online system providing online services) to enable improved authentication of a user of a user device.

More details and aspects are mentioned in connection with the embodiments described above or below. The embodiments shown in FIG. 2 may comprise one or more optional additional features corresponding to one or more aspects mentioned in connection with the proposed concept or one or more embodiments described above or below (e.g. FIGS. 1, 3, 4).

Figure 3:
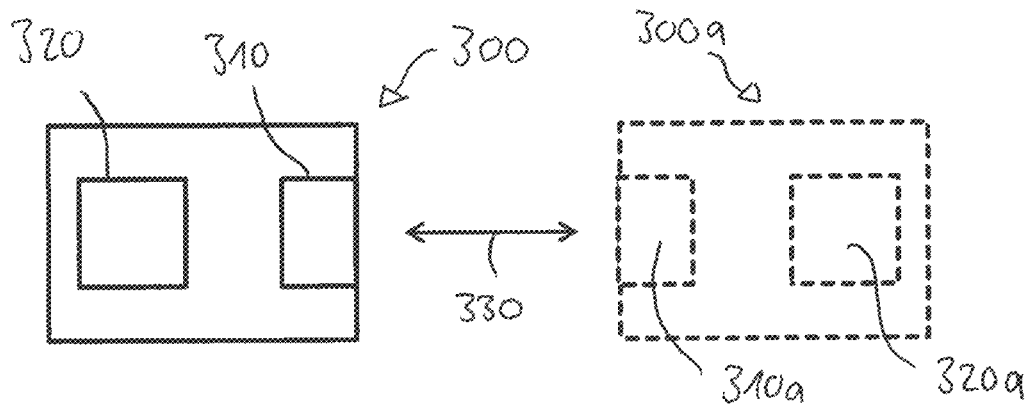
FIG. 3 shows a schematic example of an electronic device.

FIG. 3 shows a schematic example of an electronic device 300. The electronic device 300 comprises a transceiver 310 configured to transmit data to another electronic device 300a and receive data from the other electronic device 310a, via a data communication network 330. The electronic device further comprises a processing circuitry 320 configured to perform a method proposed above or below.

For example, the electronic device 300 may be a user device, such as a personal computer, a smart phone or another electronic device. The other electronic device 310a shown in FIG. 3 may be an online server or an access point, for example. The user device 300 may send a request for accessing an online service via the data communication network 330 to the online server 300a or the access point.

The online server 300a can determine whether there is a high risk, a medium risk, or a low risk that the request is sent from a non-authorized user, for example. If at the online server 300a it is decided, that the request received at the online server 300a has a medium risk to be sent by a non-authorized user, the online the server 300a can send instructions to the user device 300 to enable running a personalized local risk detector at the user device 300, for example.

The user device 300 can use the instructions received from the online server 300a to run a program for generating a user device risk score or device generated risk score. Via the communication network 330, the user device generated risk score can be sent back to the online server 300a.

For example, if the user device generated risk score received at the online server 300a indicates that there is only a low risk that the user who has sent the request is a non-authorized user, the online server 300a may allow an access of the user device to the requested service.

An example relates to a system comprising at least two electronic devices 300, 300a, wherein a first electronic device (e.g. a user device 300) is configured to send a request and to generate a device generated risk score based on instructions received from a second electronic device (e.g. an online server 300a).

More details and aspects are mentioned in connection with the embodiments described above or below. The embodiments shown in FIG. 3 may comprise one or more optional additional features corresponding to one or more aspects mentioned in connection with the proposed concept or one or more embodiments described above or below (e.g. FIGS. 1, 2, 4).

Figure 4:
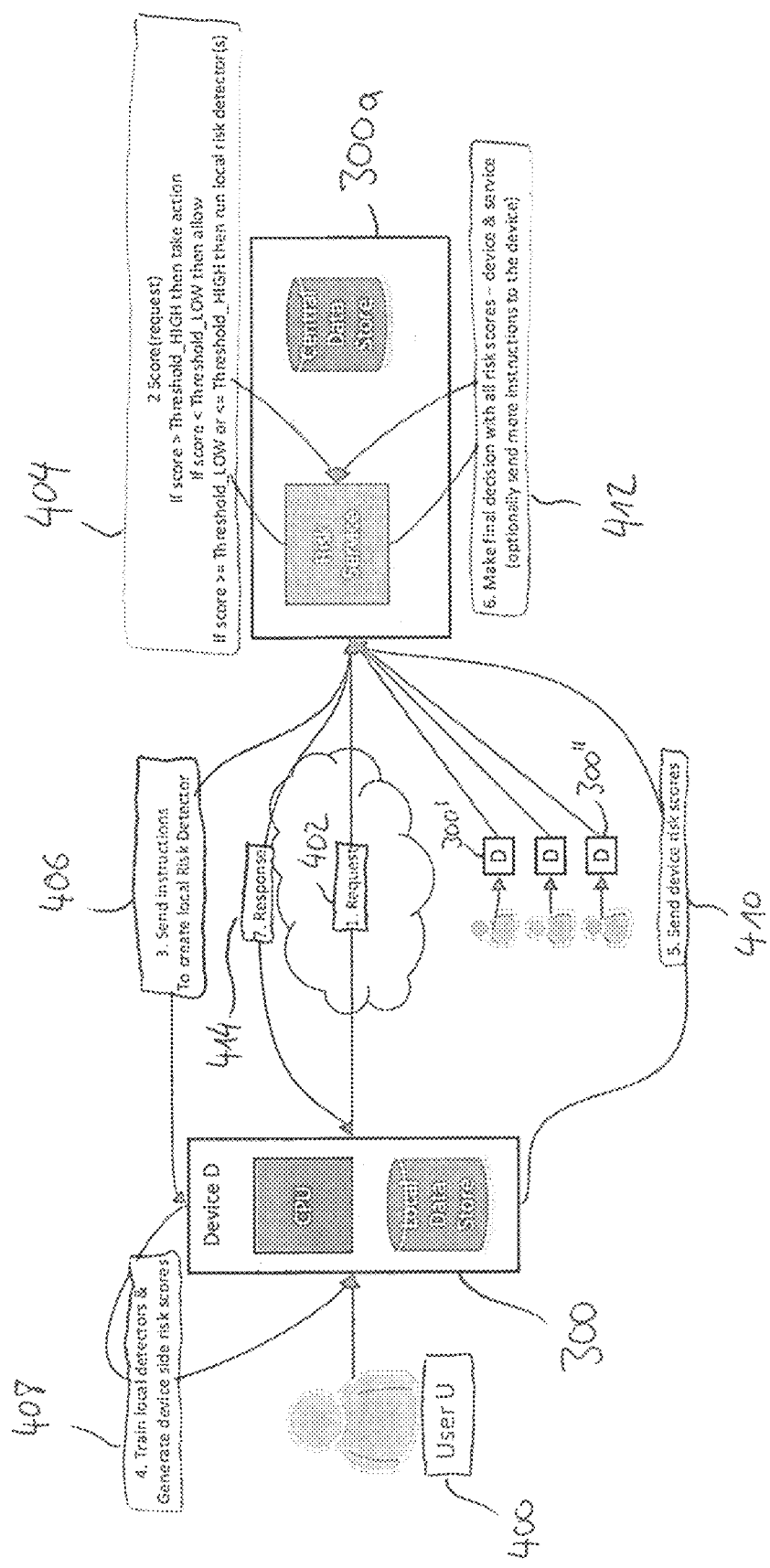
FIG. 4 shows an exemplary example of a process flow of a method for user authorization.

FIG. 4 shows an exemplary example of a process flow of a method for user authorization. An iterative process for creating a personalized risk detector is shown. A proposed personalized risk detection system is described in the following: a user 400 can send 402 a request from a user device 300 to an online server 300*a*. For example, an event is initiated by the user 400, like a payment or an authentication attempt. The event details are sent to the service provided by the server 300*a*.

The server 300*a* may run a risk model for generating a risk score. In the server, the event may be scored with a traditional model or rule set that has been created based on non-sensitive data. For example, the risk score can be above a predefined upper threshold, and a risk that the user 400 is unauthorized is high. In such case, no access may be provided to the user. In other cases, the risk score may be below a lower threshold, so that access of the user to the requested service can be allowed. In cases where the risk score is between the lower threshold and the upper threshold (e.g. grey area), the online server 300*a* may initiate running a local risk detector.

The service e.g. verifies, if a decision about the authorization of the user can be clearly made from the obtained risk score (e.g. initial risk score), e.g. obvious fraud or normal use. If a clear decision can be made instantly, a final decision will be sent 414 to the device 300 and the event will either be accepted or blocked, according to the obtained scored. No further actions are required and the request may be handled fast and based on a low amount of data, for example. Otherwise, the service will use a domain specific language (DSL) (or another program language, like e.g. a general program language) to describe one or more risk detectors (e.g. personalized according to one or more aspects of the request causing uncertainty of the authorization) to be created and evaluated in the user device 300, for example. Accordingly, the online server 300*a* may send 406 instructions to the user device 300 to create a local risk detector.

When receiving instructions from the online server 300*a*, the user device 300 may for example train 408 a local risk detector and/or generate a device side risk score. For example, the instructions may comprise a DSL, the DSL is loaded in the user device and the local detectors are built. Such detectors are personalized to the user data and depending on the initial model uncertainty, for example.

After running the program to generate the local risk score, the user device 300 can send 410 the device risk score or a plurality of different device risk scores based on different data or information of the user device 300 back to the online server 300*a*. After evaluating the instructions with the local data of the user device 300, the device risk scores are sent back to the server 300*a*.

When receiving the device risk score at the online server 300*a*, an improved risk assessment may be performed 412 based on the initial risk score generated at the online server 300*a* and the device generated risk score. The service combines the obtained scores and defines a final output, for example. For example, when considering all available risk scores, a final decision about allowing or rejecting the request may be made at the online server 300*a*.

For example, if by using only a first received device generated risk score no reliable decision about the authorization of the user can be made, further and/or improved instructions may be sent 406 to the user device 300 in a number of iterations, for generating further risk scores.

After making a final decision about the authorization of the user, the online server 300*a* can send 414 a response relating to the decision of the online server 300*a* about the authorization of the user to the user device 300. By using the possibility of local risk detectors, an improved and fast assessment of the authorization of user may be achieved while avoiding sending private and/or a high amount of data from the user device, for example.

For example, a plurality of user devices 300, 300', 300" may send requests to the online server 300*a*, and the online server 300*a* may send different instructions to each user device 300, 300', 300" adapted to the user device. The use of personalized risk detectors may reduce unnecessary processing of data so that only data or information relating to uncertain aspects of the authentication attempt may be considered during assessment of the authorization.

More details and aspects are mentioned in connection with the embodiments described above or below. The embodiments shown in FIG. 4 may comprise one or more optional additional features corresponding to one or more aspects mentioned in connection with the proposed concept or one or more embodiments described above or below (e.g. FIGS. 1-3).

As an alternative for user authentication of online services, the method may be used for assessing the authorization of a user requesting access to an area or a space, e.g. to a restricted access area, to a restricted access room, or to a box, e.g. within a room or a vehicle, e.g. a glove box or luggage compartment of the vehicle. To the skilled person it is clear that proposed methods can be applied in various use-cases.

For example, some areas of a factory may have restricted access or are secure areas of the facility. Workers of the factory may have a personal device that is used to authenticate in access points, e.g. to access the restricted area. Most of the time, access can be instantly granted or denied according to a clearance level of the individual, for example. However, in some cases, even someone that is supposed to have access to a certain area might be demonstrating an abnormal behavior. For example, access may be requested at an uncommon hour.

In this case, the access point could request extra verification steps to be performed in the user personal device, for instance, a risk detector based on previously visited locations and/or another that analyses recently contacted numbers, e.g. if the personal device has a call function.

In a traditional setting or risk detector, the user activity data can be constantly pushed to a server and stored for later use, for example. In the proposed case, that data may be kept only in the user device and only the non-sensitive (e.g. non private) data is sent to the server, e.g. the abstract device generated risk score. For example, information in the server is stored only for a short period of time in the case of a fraud being detected or a risky score being recorded.

For example, proposed concepts may use artificial intelligence (AI) algorithms for enabling the local risk detector. For example, the initial risk score generated at the online server may be based on AI and/or an AI algorithm may generate the instructions for the user device to generate the device risk score, e.g. the local risk score. Enough activity data may be stored in the device to be able to perform aggregations and train a model.

For example, a pre-approval and execution of the model can be sent that the service can cross reference in the case that the score is grey (e.g. between the upper and lower threshold). For example, the model may be executed for all requests even though the likelihood of a risk score is low, for example.

This disclosure describes a method to create personalized risk detectors in the user own device, without the need to send sensitive data to a server, for example. A proposed approach is based on an iterative process in which instructions contained in a Domain Specific Language are sent to the user device to create models locally which then will be used to perform risk checks and return risks scores to the server. The kind of checks described in the DSL might change from one user to another, thus the personalized nature of our approach which allows performing deeper checks of the data and can provide a more precise risk score for a User initiated event, for example.

A benefit of the proposed approach may be that only a subset of device data needs to be sent to the cloud. This not only may avoid having the User's data in a place that is at risk of a breach, but it also saves computing resources. It reduces the computational load on the server side to be able to offload processing of more detailed Risk Detection to the device in the case that a User request is not clearly bad or good. A goal is to avoid false positives but also increase the true positives by more precise scoring on a User's data.

For example it may be avoided sending detailed tracking information about the User/Device location to a central service (in fact some devices forbid gathering this information). In the case of a grey score (e.g. medium risk score) on the service, instructions are sent to the device to create a local model including this location data to do a deeper check on the behaviors of the User and/or Device. This may even be required under some regulations.

Risk Detection Systems operate on rules and models created on large collections of data held in a centralized location to identify patterns. They detect if the current input behaviors have a probability of matching previously seen risky patterns. The matching can be applied using rules, fuzzy matching, and statistics and/or more recently with AI models.

Despite of their technical differences, all systems have as output a risk score for a given event. Businesses then take actions based on this score. In the perfect scenario all risky behavior has a probability of 1.0 and all normal behavior has a probability of 0.0. In the real world this is never the case. There is always a distribution of good and bad scores from 0.0 to 1.0. In practice, the Business chooses a threshold above which there is an acceptable rate of False Positives (normal behaviors classified as risky). Businesses are continually looking at ways to raise the detection rates and also to lower the false positives.

However, as those systems evolve, they tend to require more and more data about the user's activity. With the advances in data privacy regulations, access to that kind of data is becoming more restricted and alternatives must be sought to improve those systems while preserving the user's privacy. Proposed concepts may enable a better assessment of user authentication while avoiding sending lots of data and/or private data from the user device to the server, for example.

The following examples pertain to further embodiments.

(1) A method for assessing user authorization, the method comprising receiving (e.g. at an authentication system such as a network based authentication system, e.g. a service provider and/or an online server and/or a stationary terminal station), via a data communication network, a request from a user device for an access; generating (e.g. by the authentication system), based on data associated with the request, a risk score indicating a risk that the request was sent by a non-authorized user, wherein the risk score indicates or indicates a high risk, a medium risk, or a low risk that the user is a non-authorized user; and signaling (e.g. by the authentication system), via the data communication network, to the user device a need for further information to enable a decision about the authorization of the user, if the risk score indicates medium risk.

For example, according to the method, the further information needed (e.g. from the user device) may comprise a device generated risk score generated at the user device. For example, upon receipt of a signaling of the need for the further information, the user device may generate the device generated risk score and send it to the entity (e.g. the authentication system, e.g. the online server; e.g. the entity to which the user device has sent the request for access) having requested it.

(2) The method according to (1), wherein the data associated with the request may comprise information about an IP address from that the request is received and/or information about a time of sending the request and/or information about a location from which the request is sent and/or an evaluation of corresponding requests received from the user device or from a same user account.

(3) The method according to (1) or (2), further comprising sending instructions for running a program to the user device to enable running the program and generating a device generated risk score at the user device; receiving the device generated risk score from the user device; and using the device generated risk score for assessing the user authorization. For example, sending instructions for running the program may comprise requesting the user device to generate a device generated risk score at the user device and to send it to the entity that is requesting the device generated risk score. For example, the method may comprise requesting the user device to generate a device generated risk score at the user device and to send it to the entity that is requesting the device generated risk score.

(4) The method according to (3), wherein the instructions for running the program comprise an instruction to use data of the user device to generate the device generated risk score, wherein the data itself is data not to be sent from the user device. For example, the method may comprise requesting the user device to generate a device generated risk score based on data of the user device, wherein the data itself is data not to be sent from the user device.

(5) The method according to one of (2) to (4), wherein the instructions for running the program are adapted for the user device according to at least one aspect of the request resulting in the risk score signaling medium risk. For example, the instructions for running the program comprise instructions to use data of the user device relating to a geographical position, if the request is received from outside of a predefined region. For example, the method may comprise sending a request for generating a device generated risk score, wherein the request is adapted for the user device according to at least one aspect of the request resulting in the risk score signaling medium risk.

(6) The method according to one of (2) to (5), wherein the instructions for running the program comprise an instruction to use data relating to at least one of a geographical position of the user device, information about a configuration of the user device, and information about usage of the user device. For example, the method may comprise sending a request for generating a device generated risk score, wherein it is requested to use data relating to at least one of a geographical position of the user device, information about a configuration of the user device, and information about usage of the user device for generating the device generated risk score.

(7) The method according to one of (2) to (6), wherein the instructions for running the program comprise an instruction to use data stored in memory of the user device. For example, the method may comprise sending a request for generating a device generated risk score, wherein it is requested to use data stored in memory of the user device for generating the device generated risk score.

(8) The method according to one of (2) to (7) wherein the instructions for running the program comprise instructions in a domain specific language. For example, the request for generating the device generated risk score comprises a request in a domain specific language.

(9) The method according to one of (2) to (8), wherein, if the device generated risk score or a combination of the device generated risk score and the risk score indicates a medium risk, the method further comprises sending additional instructions for running the program to the user device to enable generating a further device generated risk score at the user device; and receiving the further device generated risk score from the user device. For example, a further request for generating a further device generated risk score may be sent to the user device.

(10) The method according to one of (1) to (9), further comprising allowing the request of the user (e.g. to use a requested online service), if the risk score or the device generated risk score indicates a low risk.

(11) The method according to one of (1) to (10), further comprising rejecting the request of the user (e.g. to use an online service) and/or generating a fraud detection signal to signal a high probability of a request of a non-authorized user, if the risk score or the device generated risk score indicates a high risk.

(12) A method for user authorization, the method comprising: sending, via a data communication network, a request to for an access; receiving, via the data communication network, instructions for running a program and running the program for generating a device generated risk score (or e.g. receiving a request for generating a device generated risk score) indicating a risk that the request was sent by a non-authorized user; and sending, via the data communication network, the device generated risk score.

(13) The method according to (12), wherein the device generated risk score is sent without sending data used to generate the device generated risk score.

(14) The method according to (12) or (13), wherein data used to generate the device generated risk score relates to at least one of a geographical position of a user device, information about a configuration of a user device, and information about usage of a user device and/or wherein data used to generate the device generated risk score relates to data stored in memory of a user device.

(15) The method according to any of (1) to (14), wherein the assessment of user authorization is performed based on the risk score if the risk score indicates a low risk or a high risk.

(16) The method according to any of (1) to (15), wherein the assessment of user authorization is performed based on the risk score and/or at least one device generated risk score, if the risk score indicates medium risk. For example, if the risk score indicates medium risk, a final decision relating to the request may be made by using only the device generated risk score.

(17) The method according to any of (1) to (16), wherein for the assessment of user authorization the risk score and the at least one device generated risk score are combined, e.g. averaged. For example, an access may be allowed if the device generated risk score is lower than the risk score and/or if a second device generated risk score is lower than a first device generated risk score.

(18) A computer program including program code, when executed, to cause a programmable processor to perform the method of one of (1) to (17).

(19) An electronic device comprising a transceiver configured to transmit data to another electronic device and receive data from the other electronic device, via a data communication network; and a processing circuitry configured to perform a method comprising: receiving, via the data communication network, a request from the other electronic for an access; generating, based on data associated with the request, a risk score indicating a risk that the request was sent by a non-authorized user, wherein the risk score indicates a high risk, a medium risk, or a low risk that the user is a non-authorized user; and signaling, via the data communication network, the other electronic device a need for further information to enable a decision about the authorization of the user, if the risk score indicates medium risk.

(20) An electronic device comprising a transceiver configured to transmit data to another electronic device and receive data from the other electronic device, via a data communication network; and a processing circuitry configured to perform a method comprising: sending, via a data communication network, a request to for an access; receiving, via the data communication network, instructions for running a program and running the program for generating a device generated risk score indicating a risk that the request was sent by a non-authorized user; and sending, via the data communication network, the device generated risk score.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for assessing user authorization, the method comprising:
   receiving, from a user device via a data communication network, a request for an access for a user;
   generating, based on data associated with the request, a user risk score indicating a risk that the request was sent by a non-authorized user, wherein the user risk score indicates a high risk in a case that the user risk score is above a first threshold value, a medium risk in a case that the user risk score is below the first threshold value and above a second threshold value, or a low risk in a case that the user risk score is below the second threshold value that the user is a non-authorized user;
   in a case that the user risk score indicates medium risk:
      sending, to the user device via the data communication network, instructions to run a program to generate a device generated risk score at the user device;
      receiving, from the user device via the data communication network in response to sending the instructions, the device generated risk score; and
      assessing authorization of the user based on the device generated risk score;
   in a case that the user risk score indicates high risk, rejecting the request and/or generating a fraud detection signal to signal a high probability of the request being from a non-authorized user; and
   in a case that the user risk score indicates low risk, allowing the request.

2. The method according to claim 1, wherein
   the instructions to run the program comprise an instruction to use data of the user device to generate the device generated risk score, and
   the data of the user device is sensitive data not to be sent from the user device.

3. The method according to claim 1, wherein the instructions to run the program are adapted for the user device according to at least one aspect of the request resulting in the device generated risk score signaling medium risk.

4. The method according to claim 3, wherein the instructions to run the program comprise instructions to use data of the user device relating to a geographical position, in a case that the request is received from outside of a predefined region.

5. The method according to claim 1, wherein the instructions to run the program comprise an instruction to use data relating to information about usage of the user device.

6. The method according to claim 1, wherein the instructions for running the program comprise an instruction to use data stored locally at the user device for generating the device generated risk score.

7. The method according to claim 1, wherein the instructions to run the program comprise instructions in a domain specific language.

8. The method according to claim 1, wherein in a case that the device generated risk score or a combination of the device generated risk score and the user risk score indicates medium risk, the method further comprises:
   sending, to the user device via the data communication network, additional instructions to run the program to generate a further device generated risk score at the user device; and
   receiving, from the user device via the data communication network in response to sending the additional instructions, the further device generated risk score.

9. A method for user authorization, the method comprising:
   sending, to an electronic device via a data communication network, a request for an access for a user;
   receiving, from the electronic device via the data communication network in a case that a user risk score indicates medium risk, instructions to run a program to generate the user risk score, wherein the generating is based on data associated with the request, and the user risk score indicating a high risk in a case that the user risk score is above a first threshold value, indicating a medium risk in a case that the user risk score is below the first threshold value and above a second threshold value, or indicating a low risk in a case that the user risk score is below the second threshold value that the user is a non-authorized user;

running the program, in response to receiving the instructions, to generate a device generated risk score indicating a risk that the request was sent by a non-authorized user;

sending, via the data communication network, the device generated risk score;

receiving, from the electronic device via the data communication network in a case that the user risk score indicates high risk, a first indication that the request is rejected; and receiving, from the electronic device via the data communication network in a case that the user risk score indicates low risk, a second indication that the request is allowed.

10. The method according to claim 9, wherein the device generated risk score is sent without sending data used to generate the device generated risk score.

11. The method according to claim 9, wherein data used to generate the device generated risk score relates to information about usage of a user device.

12. An electronic device, comprising:
a transceiver configured to transmit data to another electronic device and receive data from the another electronic device, via a data communication network; and
processing circuitry configured to receive, from the another electronic device via the data communication network, a request for an access for a user;

generate, based on data associated with the request, a user risk score indicating a risk that the request was sent by a non-authorized user, wherein the user risk score indicates a high risk in a case that the user risk score is above a first threshold value, a medium risk in a case that the user risk scare is below the first threshold value and above a second threshold value, or a low risk in a case that the user risk score is below the second threshold value that the user is a non-authorized user;

in a case that the user risk score indicates medium risk:
send, to the another electronic device via the data communication network, instructions to run a program to generate a device generated risk score at the another electronic device;
receive, from the another electronic device via the data communication network in response to sending the instructions, the device generated risk score from the another electronic device; and
assess authorization of the user based on the device generated risk score;

in a case that the user risk score indicates high risk, reject the request and/or generate a fraud detection signal to signal a high probability of the request being from a non-authorized user; and in a case that the user risk score indicates low risk, allow the request.

* * * * *